Dec. 7, 1965     F. W. KUETHER     3,221,554
HIGH TEMPERATURE SENSORS
Filed Jan. 9, 1964

INVENTOR.
FREDERICK W. KUETHER
BY Robert O. Vidas
ATTORNEY

United States Patent Office 3,221,554
Patented Dec. 7, 1965

3,221,554
HIGH TEMPERATURE SENSORS
Frederick W. Kuether, Minneapolis, Minn., assignor to Honeywell Inc., a corporation of Delaware
Filed Jan. 9, 1964, Ser. No. 336,799
4 Claims. (Cl. 73—359)

The present invention is directed to a high temperature sensor which is especially useful in measuring the temperature and/or heat transfer of an extremely high temperature source such as a gas plasma.

Gas plasmas encompass temperatures well above the capability of direct contact type sensors—temperatures of from 10,000° F. to in excess of 50,000° F. At these temperatures, all known materials are gases. Any sensor placed into such an environment and allowed to come to equilibrium with the environment will vaporize.

By use of my invention ready determination can be made of temperatures of plasma and/or the heat transfer capability of such a plasma. This can be done without apparent attack of the sensor by the extremely hot plasma.

My invention can best be understood from a study of the specification and drawings, wherein.

Figure 1:
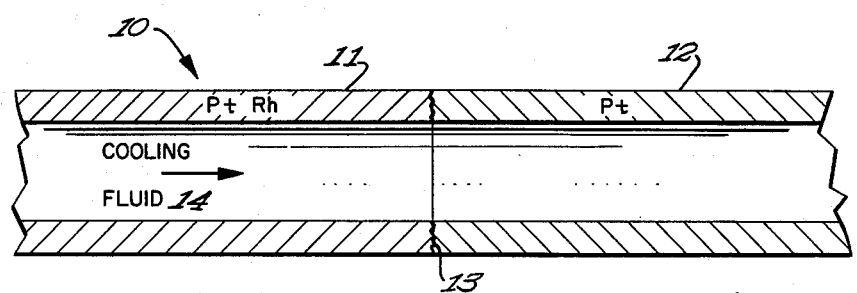
FIGURE 1 is a sensor element in accordance with the invention.

Referring now to FIGURE 1, there is illustrated a sensor element 10 in tubular form comprising two dissimilar metal members 11 and 12 butt welded to form a thermoelectric junction 13. In the specific example shown, the members 11 and 12 are illustrated as platinum-rhodium/platinum. Such a thermocouple pair is well known in the art and the temperature-EMF characteristics are available from standard tables. Other thermocouple pairs may also be used, such as copper/constantan and the like. Also illustrated in FIGURE 1 is a cooling fluid 14 passing through the core of the tube so as to provide a more or less constant internal temperature $T_1$. Slight changes of $T_1$ will be insignificant in view of the extremely hot temperatures being measured. The fluid may be of a variety of liquid or gases, but is preferably plain water. As will be elaborated on below, water can be advantageously used due to its relatively good cooling effect and the stability of the internal temperature of the thermocouple junction.

Figure 2:
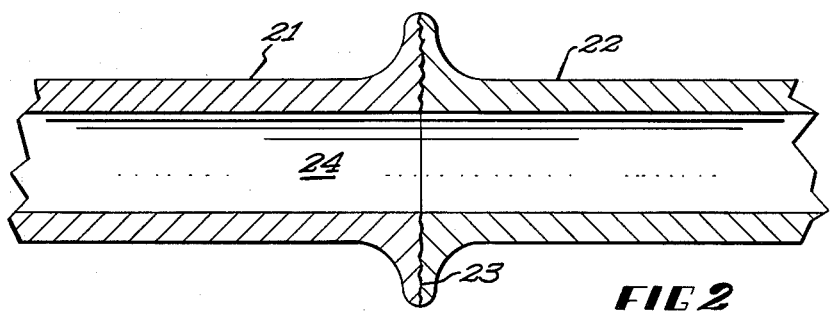
FIGURE 2 is a modified sensor in accordance with the invention.

FIGURE 2 is a modified form of a sensor in accordance with FIGURE 1 where a flange is produced at the junction 23 of the dissimilar metals 21 and 22. A bore 24 is provided as in FIGURE 1 for the cooling fluid. This configuration of the sensor is advantageous as it reduces the cooling effect along the length of the tube as a factor in the junction temperatures.

Figure 3:
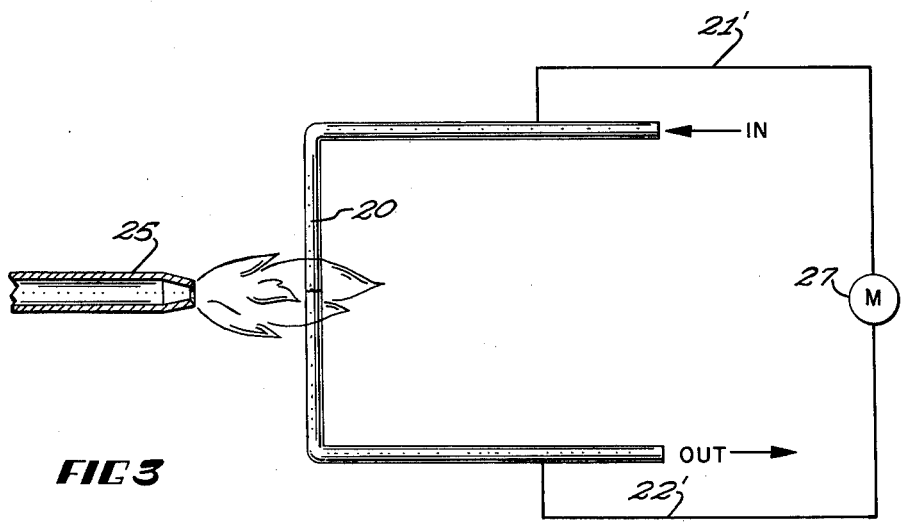
FIGURE 3 is a schematic illustration of a plasma source, a sensor in accordance with the present invention, and associated circuit means, and fluid cooling means.

In FIGURE 3 there is illustrated in schematic form the use of the sensor of the present invention. A high temperature plasma source 25 provides a hot plasma generally indicated 26. A sensor 20 in accordance with the present invention is placed into the path of the hot plasma. Sensor 20 has associated with it a cooling source of fluid, not shown, and illustrated as passing through the internal bore of the sensor element via the input and exhaust. Also shown are lead means 21' and 22' and meter means 27 associated with these leads. Operation of the sensor will now be described in somewhat greater detail.

Sensor element 10, as has already been indicated, may be formed of a variety of thermoelectric pairs. Similarly, the actual physical size of the element may be varied over considerable ranges. I have found that a sensor element having an internal bore of from .010 to .040 inch with a wall thickness of less than .060 inch works quite well as it is rapid in its response to the environment and is small enough to be convenient for use. When the cooling fluid is water, it is passed through the internal portion of the sensor at a velocity sufficient to keep the water from vaporizing. In the instance where maximum possible precision is desired a constant internal temperature is necessary. In this case the rate of flow of the cooling fluid is controlled to be sufficient to provide the necessary cooling. Ordinarily, a small change in internal temperature is not important when one considers the extremely high temperatures being measured. As an external plasma is directed against the junction, a laminar film of the plasma gas is formed about the sensor. This film provides a graded temperature across itself so that the external portion of the film is at the temperature of the plasma and as the surface of the sensor is reached, the plasma (or hot gas) temperature has been reduced to some workable temperature within the stable E.M.F. range of the sensor materials. In the instance of a platinum-rhodium sensor, this would be at approximately 2,500° F. The actual E.M.F. output of the thermocouple is thus a function of the $T_1+T_2$ ($T_2$ being the skin temperature of the metal) divided by 2. This E.M.F. output can then be utilized to determine the plasma temperature and/or heat transfer capabilities.

In order to utilize the invention as a temperature sensor, there are certain variable which must be known. The laminar film of gas resulting from the plasma varies in thickness somewhat dependent upon the rate of flow of the plasma over the surface of the sensor. If the rate of flow of the plasma is very high, this film will be thin and correspondingly the skin temperature of the sensor will be considerably higher for a given temperature than it would be if the rate of flow of the plasma was lower. The determination of this rate flow is thus necessary to determine temperature. Likewise, the composition of the gas of the plasma must be known in order to measure the temperature of the plasma. The heat transfer abilities of plasmas are dependent upon the composition of the gases involved in the plasma. When the gas composition of the plasma is known, this factor may be included withing calculations to demonstrate the actual temperature of the plasma. Even if these factors are not known, one can very readily determine the heat transfer capabilities of the plasma through utilization of the sensor of my invention. The actual temperature sensed ($T_1+T_2/2$) is a direct function of the heat transfer of the plasma. Such information is needed in the use of plasma guns for the vapor depositing of metals on ceramic and the like.

As illustrative of the present invention, I have found that a thermocouple sensor in conformance with the description given above as to dimensions and formed of copper/constantan and can be used for sensing the temperature of a hot argon plasma at temperatures well in excess of 10,000° F. for indefinite periods of time without degredation of the sensor. The sensor remains bright and clean and shows no evidence of attrition of the surface.

Having described my invention, I claim:

1. A temperature sensor comprising tubes of first and second dissimilar metal members butt welded to form a thermocouple junction, means for passing a cooling fluid through the bore of said thermocouple junction, and meter means connected to said members for measuring the electrical ouptut of said thermocouple.

2. A senson for measurement of exteremely high temperatures comprising tubes of platinum and platinumhodinum butt welded to form a thermocouple junction having a bore therethrough, means for passing a cooling fluid through the bore of said thermocouple junction, and meter means connected to said platinum and patinum-rhodium for measuring the electrical output of said thermocouple.

3. A temperature sensor comprising tubes of first and second dissimilar metal members butt welded to form a thermocouple junction, means for passing water through the bore of said junction, and meter means connected to said members for measuring the electrical output of said thermocouple.

4. The method of measuring the heat transfer characteristics of a high temperature plasma comprising forming a thermocouple junction of tubes of dissimilar members, placing said thermocouple into the plasma, passing a cooling fluid through the bore of said thermocouple to maintain a near constant internal temperature, and measuring the electrical output of said thermocouple.

References Cited by the Examiner
UNITED STATES PATENTS

| | | | |
|---|---|---|---|
| 1,577,874 | 3/1926 | Ruben | 136—4.1 |
| 3,045,487 | 7/1962 | Raezer | 73—359 X |
| 3,142,158 | 7/1964 | Podolsky | 62—3 |

LOUIS R. PRINCE, *Primary Examiner.*